July 15, 1941.  R. STEVENSON  2,249,188
SEAL CONSTRUCTION
Filed Oct. 3, 1939   3 Sheets-Sheet 2
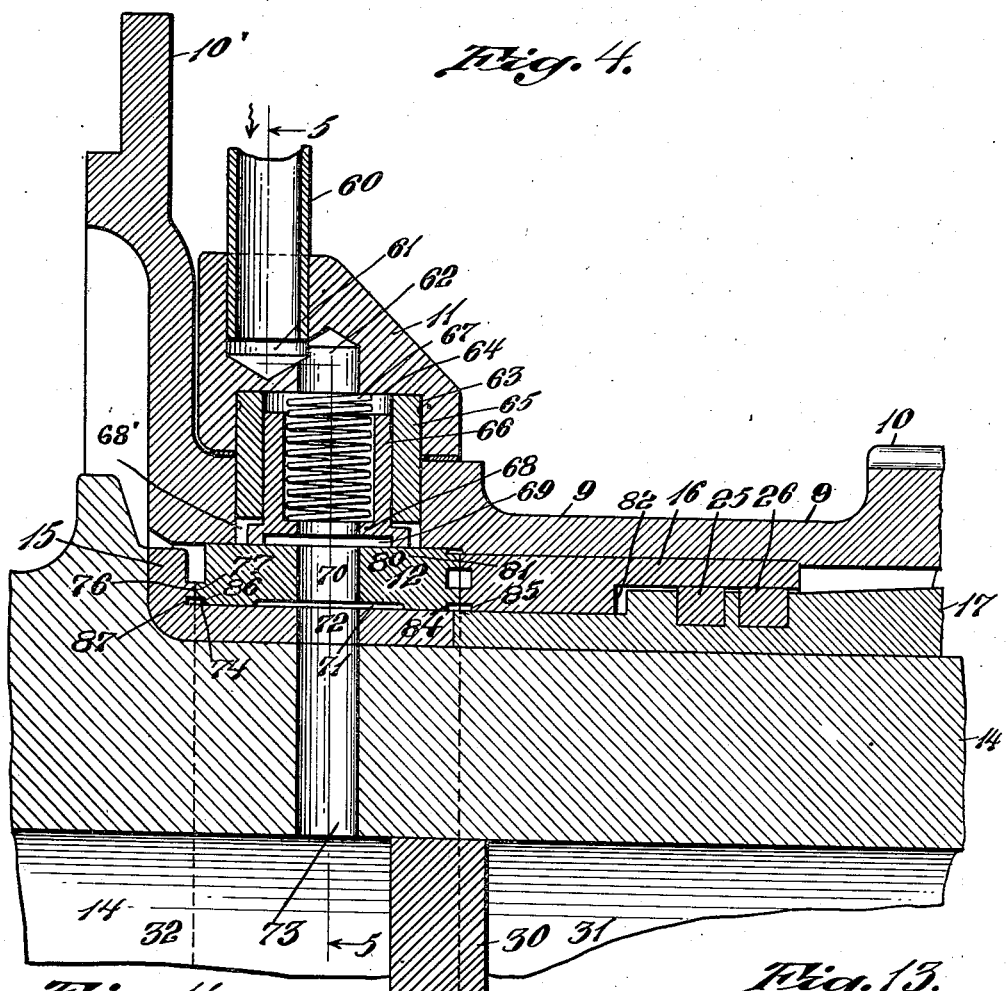
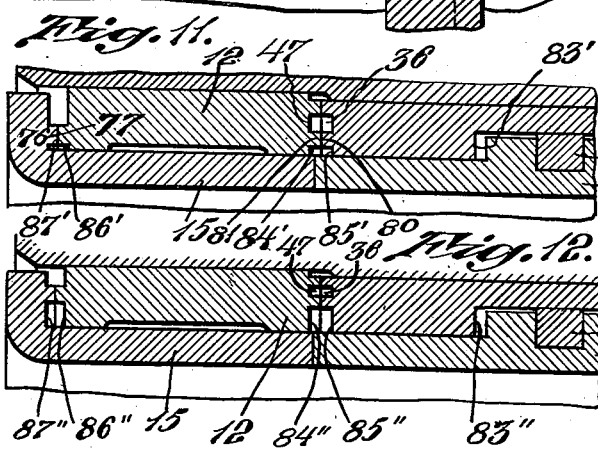
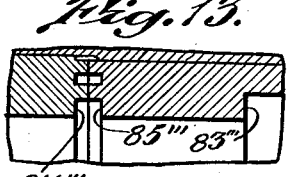
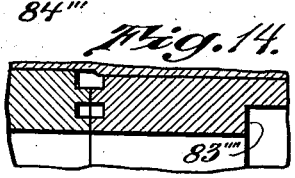
INVENTOR.
Robert Stevenson
BY Barlow & Barlow
ATTORNEYS.

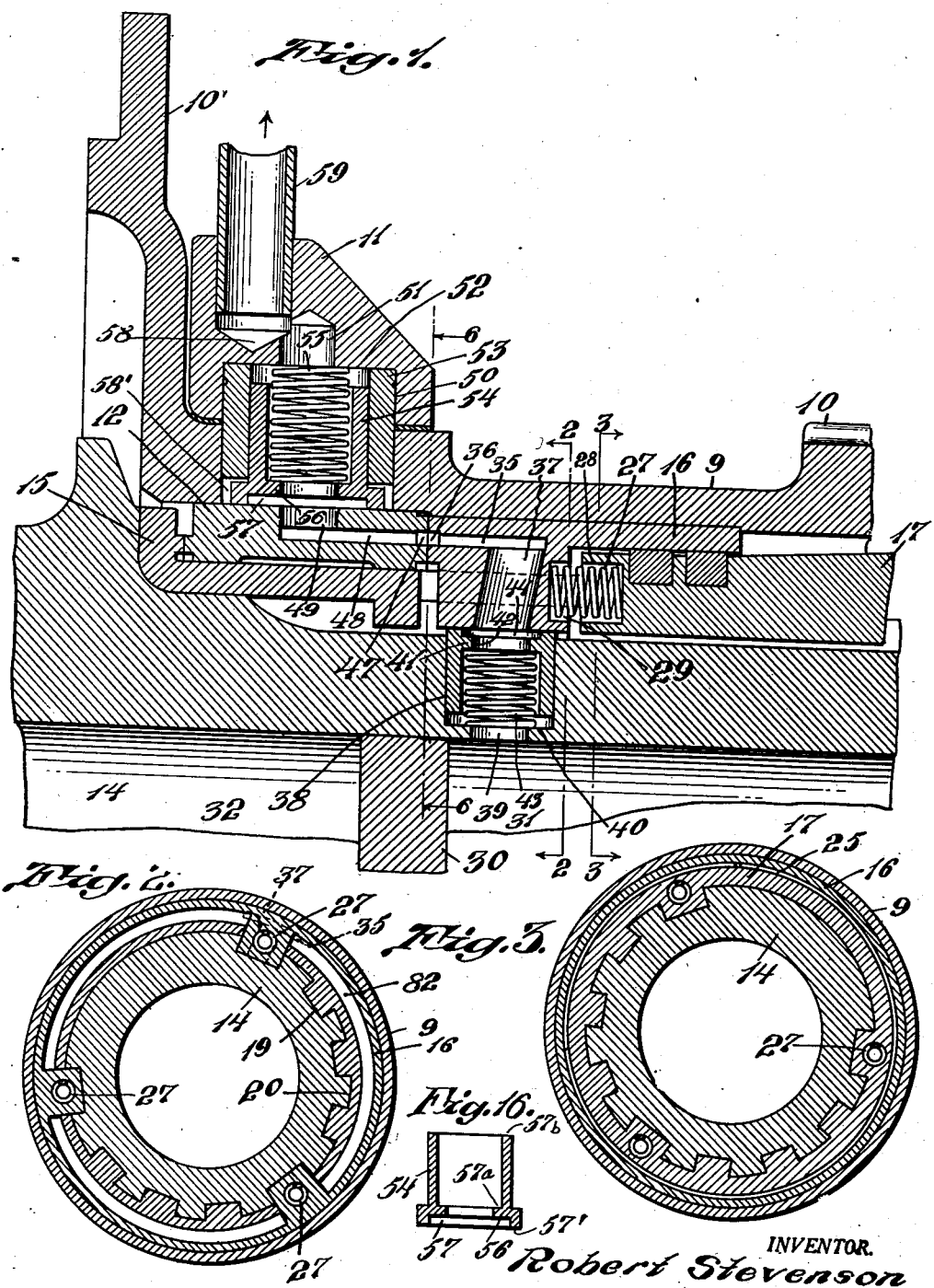

July 15, 1941.  R. STEVENSON  2,249,188
SEAL CONSTRUCTION
Filed Oct. 3, 1939  3 Sheets-Sheet 3
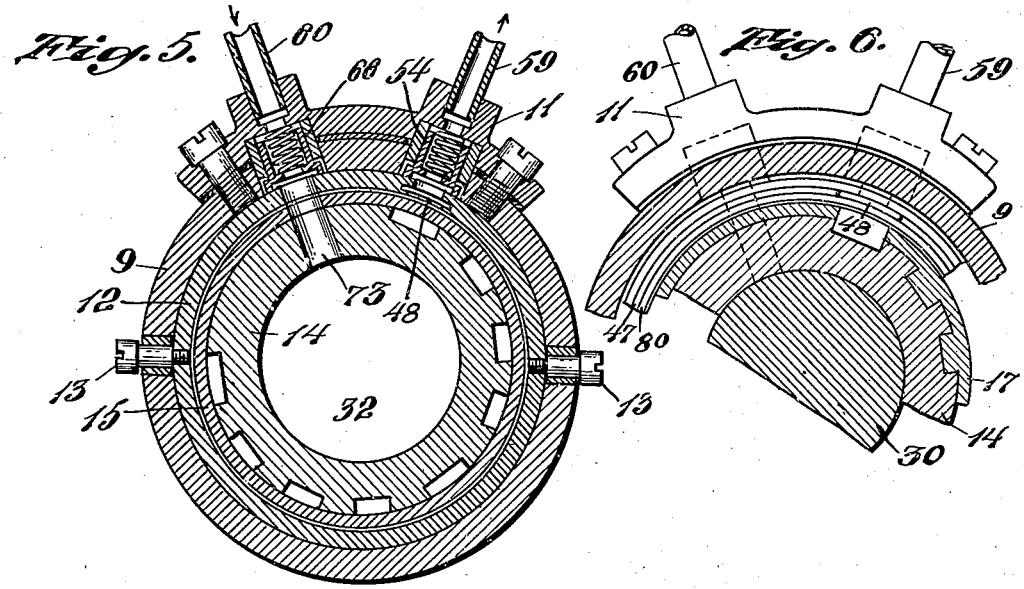
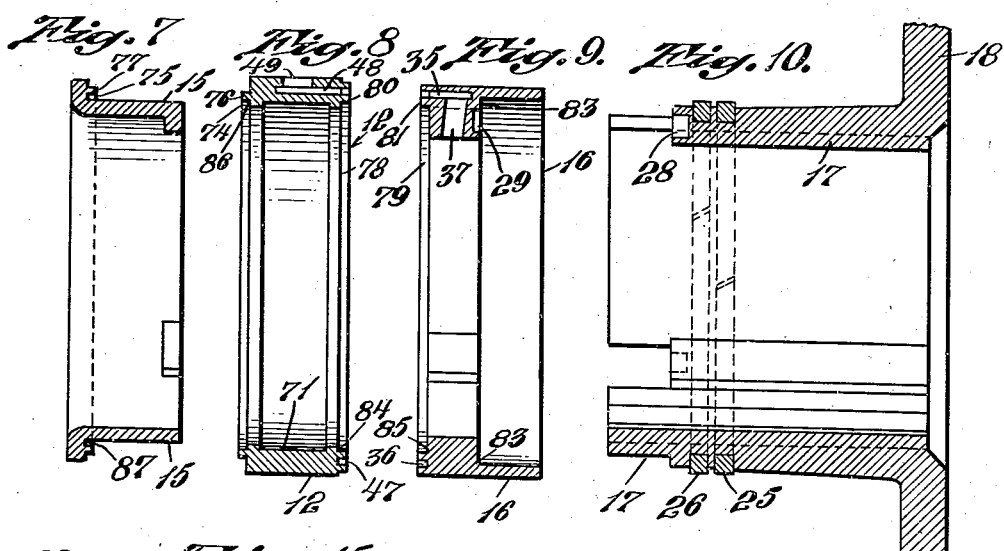
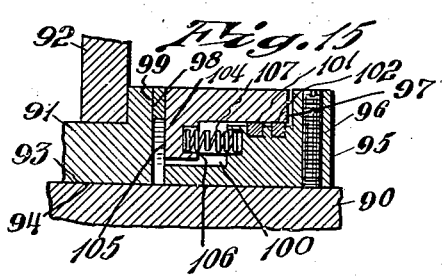
INVENTOR.
Robert Stevenson
BY Barlow & Barlow
ATTORNEYS.

Patented July 15, 1941

2,249,188

UNITED STATES PATENT OFFICE 2,249,188

SEAL CONSTRUCTION

Robert Stevenson, Providence, R. I., assignor to Sealol Company, a corporation of Rhode Island Application October 3, 1939, Serial No. 297,715

15 Claims. (Cl. 285—96.3)

This invention relates to a fluid seal construction and is a continuation in part of the structure shown in my prior application, Serial No. 120,487, filed January 14, 1937, and my application, Serial No. 137,646, filed April 19, 1937; and has for one of its objects the utilization of the pressure of the fluid itself for controlling the seal instead of relying wholly upon some mechanical action for forcing the parts to be sealed into engagement against the fluid pressure developed.

Another object of the invention is the provision of means whereby the fluid pressure will exert sealing pressure on a sealing element and whereby such sealing pressure may be proportioned to the liquid pressure to insure a desired limited maximum pressure on the seal.

Another object of the invention is the provision of a sealing element having surfaces acted on in opposite directions by pressure of the fluid itself and so proportioning the areas of such surfaces as to govern the effect of the fluid pressure on the sealing pressure to control the desired sealing pressure by the fluid pressure to insure a desired predetermined limited maximum pressure on the seal.

Another object of the invention is to provide a seal with a minimum amount of retarding action or friction upon the shaft and thus a more efficient operating device.

Another object of the invention is the provision of means whereby the fluid pressure may be utilized to provide a minimum amount of sealing pressure, and thereby decrease the friction or drag on the shaft to a minimum.

Another object of the invention is to provide some means such as a spring for maintaining a desired pressure when the fluid pressure is light or at the commencement of the building up of the fluid pressure which will later itself act to control the seal.

Another object of the invention is to provide several sealing surfaces with the pressure for sealing one transmitted in such a way that this same pressure will seal additional surfaces.

Another object of the invention is to provide a plurality of sealing surfaces with graduated pressures acting upon these surfaces progressively.

Another object of the invention is to provide sealing surfaces on either side of a radial flow from a shaft which will permit of sliding of two parts through which the flow passes one relative to the other for effecting the seals by movement axially of the shaft.

With these and other objects in view, the invention consists of certain novel features of construction, as will be more fully described, and particularly pointed out in the appended claims.

In the accompanying drawings:

Fig. 1 is a fragmental sectional view illustrating a portion of a rotary shaft and a portion of the relative stationary mechanism with the seal which is the feature of this invention arranged between the two;

Fig. 2 is a section on line 2—2 of Fig. 1;

Fig. 3 is a section on line 3—3 of Fig. 1;

Fig. 4 is a section similar to Fig. 1 but illustrating the section at a different angular position than shown in Fig. 1;

Fig. 5 is a sectional view on substantially line 5—5 of Fig. 4;

Fig. 6 is a sectional view on substantially line 6—6 of Fig. 1;

Fig. 7 is a section in detail on somewhat smaller scale of a member which rotates with the shaft;

Fig. 8 is a section view of the ring through which exit and return passage is made and which presents sealing surfaces on either side;

Fig. 9 is a section view showing a sleeve which is actuated to cause a seal to be formed;

Fig. 10 is a section detailed view of another member which rotates with the shaft;

Figs. 11 and 12 are modified views of the members shown in Figs. 7, 8, 9 and 10 to present different pressure relationships;

Figs. 13 and 14 are fragmental sectional views of the further modified detail of the sealing surfaces presented between the ring and the sleeve;

Fig. 15 is a fragmental view in section of a still differently modified arrangement of sealing mechanism; and Fig. 16 is a detailed sectional view of a sliding sleeve.

It is found in the use of such a construction as I have illustrated in my first referred to application, Serial No. 120,487, filed January 14, 1937, that when the nut and intermediate spring is tightened sufficiently to supply an adequate seal when a heavy pressure exists in the fluid, or when the mechanical action relied upon for sealing is free to press the sealing surfaces together by its entire pressure, because the pressure in the fluid is low, the sealing parts may be forced together under such pressure that they bind, due to the high friction developed, and the sealing parts may substantially freeze together. It is an object of my invention to prevent such a condition rising and to control the maximum pressure on the seal. To this end I provide means whereby the fluid pressure itself controls the seal pressure, and in the preferred embodiment of my invention here shown I have provided a sliding sleeve and a chamber into which a flange of this sleeve projects, and into which the fluid is directed. Movement of the sleeve effects sealing contact of the sealing members, and by proportioning the areas of opposing faces of the flange, I may regulate the effective pressure of the fluid on said flange, to control the sealing pressure. Depending upon the conditions to be met in any particular structure, the fluid pressure on opposing faces of the flange may be in balance, or said fluid pressure in one direction may be greater than in the other, to govern sealing pressure on the seal members as the fluid pressure increases or decreases in the chamber; or where I provide several sealing surfaces, these may be so proportioned that the pressure progressively increases in a desired arrangement, by which arrangement I may arrange to pass fluid to one member, such as a ring, from a relatively rotating other member, such as a shaft, and seal the surfaces on either side of the fluid flow line; and the following is a more detailed description of the preferred embodiment of this invention, illustrating the preferred means by which these advantageous results may be accomplished.

With reference to the drawings, there is shown a relatively stationary casing having a tubular portion 9 provided at one end thereof with a sun gear 10 and at the other end with a flange 10'. A non-rotatable ring 12 is axially slidably held within the casing by set screws 13 as shown in Fig. 5. The rotary parts comprise a tubular shaft 14 with a collar member 15 (see also Fig. 7), mounted thereon to provide an abutment. The tubular member 17 having a flange 18 which is engaged by a nut (not shown) on the shaft to maintain it firmly in position. The non-rotatable ring 12 (Fig. 8) slides over this member 15 while a sleeve 16 (see Fig. 9) which also rotates with the shaft 14 slides over the tubular member 17. The sleeve 16 and the tubular member 17 as well as the member 15 have a plurality of splines for slidably fitting into corresponding recesses and splines in the shaft 14 as at 19 and 20 (see Figs. 2, 3 and 5) to cause them to rotate with the shaft and yet permit the sleeve 16 or member 17 to be axially movable therealong. Two piston rings 25, 26 in the tubular member 17 serve to seal the sliding joint between the member 17 and the sleeve 16. A plurality of springs 27 such as three here shown, located at substantially one hundred and twenty degrees apart in certain of the splines are set in recesses 28 in the tubular member 17 and are received in recesses 29 of the sleeve to urge the sleeve to the left as shown in Fig. 1 of the drawings.

The shaft 14 has a division wall 30 somewhere along its length but conveniently located as shown in the drawings. This is merely one form of providing a division between a low pressure side 31 and a high pressure side 32 of the tubular shaft as convenient receptacles for oil to be utilized. I will withdraw fluid carried by the shaft 14 from the low pressure side and transfer it to a booster pump and then return it to some conduit such for instance as a shaft chamber 32 for transmission to the pitch changing mechanism for the propeller. The conduit for withdrawing the oil from the low pressure side of the shaft consists of a slot 35 (see Figs. 2 and 9) covering a short arc and extending axially inwardly in the sleeve 16. This slot connects with the annular groove 36 in the abutting sealing face of the sleeve. A hole 37 extends generally radially through a spline of the sleeve in a location to register with a bore 38, 39 in the shaft 14. The portion 39 is smaller than the portion 38 of the bore providing a shoulder 40 while a sleeve 41 is slidable in the bore and has an inwardly projecting flange 42 which is engaged by the spring 43 which engages shoulder 40 and urges the sleeve to seal with the spline through which the hole 37 extends. In this manner the oil is picked up from the low pressure chamber in the shaft and transmitted to the annular groove 36 and the annular groove 47 in the sleeve which registers with this groove 36, and is in the non-rotating ring 12. An arcuate slot 48 is provided in this ring to connect with opening 49 which registers with a bore 50, 51 providing a shoulder 52. The bore 50 is bushed as at 53 which bushing is located partly in the tubular body portion 9 and partly in an arcuate plate 11. A sleeve 54 is slidable in the bushing 53 and is urged by spring 55 engaging the shoulder 52 and the flange 56 which extends inwardly from the sleeve 54. A recess 57 provides a surface 57' on one side of the flange proportioned so as to be equal in area to the surfaces 57a, 57b (see Fig. 16) oppositely exposed to the pressure of the fluid so that any pressure existent will be balanced and the pressure of the spring 55 alone will act to seal the surface at the edge of the sleeve with the ring. The surface 57c is in a chamber 58' which opens to the atmosphere so that no built up pressure exists. These surfaces may be differently proportioned so as to regulate the effective pressure of the fluid on the sleeve to control the sealing pressure. The bore 51 connects with a bore 58 in the arcuate plate 11 to which a pipe 59 is attached for connection to a booster pump not shown.

Returning from the booster pump the oil is returned to the other side of the division wall 30 through the pipe 60 at a different angle to the center of the shaft as perhaps best illustrated in Figs. 5 and 6. The section through this different location is shown in Fig. 4 where we find the bore 61 in which the pipe 60 is located as connecting with the bore 62 in the arcuate plate 11. This bore 62 is also a part of a larger bore 63 providing a shoulder as at 64, there being a bushing 65 in the bore 63 partly in the tubular body 9 and partly in the plate 11. A sleeve 66 is slidable in this bushing and urged toward sealing position by spring 67 engaging the shoulder 64 and engaging an inwardly extending flange 68 on the sleeve. A recess 69 provides substantially the same surface area on the oppositely acting surfaces so as to balance the pressure which may be existent in the oil as it passes through this bore, similarly as above described in connection with the sleeve 54 no pressure exists in chamber 68'. A bore 70 in the ring 12 communicates with an annular groove 71 in the inner surface of the ring forming an annular chamber or pocket from which groove oil may be picked up by the radial hole 72 in the member 15 and 73 in the shaft 14, this hole communicating with the chamber 32 on the other side of the wall 30 for the high pressure storage of the actuating fluid carried by the shaft.

The high pressure oil may creep between the ring 12 and the member 15 to the annular grooves 74 in the ring and 75 in the member 15 just beneath the sealing abutting surfaces 76, 77 and also to the annular groove 78 in the ring and 79 in the sleeve just beneath the sealing surfaces 80 and 81, while this pressure will also be existent by reason of the connection through the splines in the chamber 82 to effect the surface 83 presented by the inwardly extending portion of the sleeve 16. The pressure thus existent is present upon the surface 83 and the surface 84, 85 provided by the groove 78, 79. Also on the surfaces 86 and 87 provided by the grooves 74 and 75. I so proportion the areas of the surfaces acted on by this pressure as to control movement of the parts as desired.

In Fig. 4 the surfaces 86, 87, 84 and 85 are equal in area and thus pressure on these surfaces by reason of oil contacting them will be equal while the surface 82 is greater in area than either of these so that the pressure of the oil existent in these communicating places will apply greater pressure here and force the sleeve to the left in Fig. 1 or 4 and provide an effective seal between the surfaces 80 and 81 and by transmission of the same pressure through the ring to also effect a seal of the abutting surfaces 76 and 77.

In Fig. 11 the arrangement is changed somewhat. The equal surfaces 86', 87' are here of lesser area than the equal surfaces 84' and 85' while the surface area 83' is still greater than the surface area 84' or 85' so that in this case there is a progressive application of pressure providing the seal on the abutting surfaces 80, 81 and 76, 77.

In Fig. 12 the surfaces 86'', 87'', 84'' and 85'' are all of equal area and the surface 83'' is proportioned to be slightly greater than any of these surfaces so as to balance the force acting on the surfaces of the groove formed between the abutting sealing surfaces 80 and 81 on the low pressure side of the seal. In this arrangement the effective sealing pressure applied upon the sealing surfaces is that exerted by the force of the spring 27.

In Fig. 13 the surfaces 84''', 85''' are slightly larger than the surfaces shown at 84', 85' but yet smaller than the surface 83'''.

In Fig. 14 there is no surface corresponding to 84, 85 or the prime for these numbers but the surface 83'''' serves to seal the abutting surfaces located at the inner edge of the ring and sleeve as well as a similarly arranged abutting surface at the inner edge of the ring and the opposite edge thereof.

In Fig. 15 I illustrate a means of providing an oil seal between a rotatable shaft 90 and a bearing 91 for this shaft or an opening for it through a suitable casing 92 which may serve to contain lubricant. This lubricant will seep along the bearing between the surface 93 thereof and the surface 94 of the shaft, and in order to provide an effective seal for this escaping lubricant F mount a collar 95 which has a snug fit on the shaft 90 and is held in place by set screw 96. This collar has a sleeve 97 slidably mounted thereon and which is provided with a hardened ground sealing surface or facing 98 to contact with the ground surface 99 of the bearing 91. An annular chamber 100 will receive the lubricant which may have escaped and the slidable sleeve is sealed against escape of this lubricant from the chamber by the expansible rings 101 and 102 which are located in recess 103 in the collar 95 and contact with the sliding sleeve 97. A flange 104 on the sleeve extends into this annular pocket 100 and presents a surface 105 toward the ground surface 99 of the bearing 90 and a surface 106 on its side away from the surface 99, while springs 107 located between the collar and the flange serve to force the sleeve toward sealing engagement. By this arrangement I may cause the surfaces 105 and 106 to be of such relative sizes that I may either balance any pressure which is existent in the pocket 100 or I may cause the surface 106 to be greater than the surface 105 so that a force will exist due to the escaping lubricant under pressure tending to move the sleeve into sealing engagement. Thus, by reason of the pressure of the escaping lubricant I effectively cause a seal to exist.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A seal between two relatively rotatable parts comprising a non-rotatable ring member presenting two sealing surfaces, a rotatable shaft provided with a flange for engagement with one sealing surface of the ring member, a sleeve slidable on and rotatable with the shaft having a sealing surface in engagement with the other sealing surface of the ring, said sleeve having surfaces exposed to the fluid to be sealed, which said surfaces are so proportioned as to areas and so related as to position as to provide fluid pressure on the sleeve toward the sealing surfaces to govern the effect of the fluid pressure on both of said sealing surfaces by reason of the transmission of the pressure on the sleeve to one sealing surface and thence through the ring to the other sealing surface.

2. A seal between two relatively rotatable parts comprising a non-rotatable ring member, a rotatable shaft provided with a flange for engagement with one sealing surface of the ring member, a sleeve on the shaft having a sealing surface at one end in engagement with the other surface of the ring, said sleeve having at a location spaced from said sealing surface an inwardly extending portion exposed to said fluid to be sealed to present an area on the side away from the seal and an area on the side nearest the seal whereby the pressure of the fluid will tend to force the inwardly extending portion and sleeve carrying it in directions dependent upon the relative areas exposed to fluid pressure on the different sides of said inwardly extending portion.

3. In a fluid seal for the transmission of liquid from a relatively fixed member to a rotating member having a central bore, comprising a ring on the relatively fixed member for providing a portion of an annular chamber for liquid about the axis of the rotating member, a conduit leading from the bore of the rotating member to said chamber and a supply conduit carried by the fixed member also connected to the chamber, said ring presenting ground surfaces on either side of said chamber, cooperating ground surfaces secured to said rotating member for engaging the ground surfaces on said ring, an expansion chamber communicating with the fluid supplied under pressure, an inwardly extending portion associated with said rotating member to extend into said expansion chamber to present an area on the side away from the seal, and an area on the side nearest the seal whereby the pressure of the fluid will tend to force the portion and member carrying it in directions dependent upon the relative areas exposed to fluid pressure on the different sides of the portion.

4. In a fluid seal for the transmission of liquid from a relatively fixed member to a rotating member having a central bore, comprising a ring on the relatively fixed member for providing a portion of an annular chamber for liquid about the axis of the rotating member, a conduit leading from the bore of the rotating member to said chamber and a supply conduit carried by the fixed member also connected to the chamber, said ring presenting ground surfaces on either side of said chamber, cooperating ground surfaces secured to said rotating member for engaging the ground surfaces on said ring, and common means for applying pressure to both cooperating ground surfaces on either side of said ring, comprising an expansion chamber communicating with the fluid supplied under pressure, one of said members having an inwardly extending portion to extend into said expansion chamber to present an area on the side away from the seal, and an area on the side nearest the seal whereby the pressure of the fluid will tend to force the portion and member carrying it in directions dependent upon the relative areas exposed to fluid pressure on the different sides of said portion.

5. A seal between two relatively rotatable parts comprising a non-rotatable ring member presenting two sealing surfaces, a rotatable shaft having a flange for engagement with one sealing surface of the ring member, a sleeve on the shaft having a sealing surface in engagement with the other surface of the ring, said ring presenting areas on its opposite sides and said sleeve having an inwardly extending portion to present areas on the side away from the seal and on the side nearest the seal, all of said areas being exposed to the fluid to be sealed, whereby the pressure of the fluid will tend to force the ring and the sleeve in directions dependent upon the relative areas exposed to the fluid pressure on the different sides of said ring and inwardly extending portion.

6. A seal between two relatively rotatable parts comprising a non-rotatable ring member presenting two sealing surfaces, a rotatable shaft having a flange for engagement with one sealing surface of the ring member, a sleeve on the shaft having a sealing surface in engagement with the other surface of the ring, said ring presenting areas on its opposite sides and said sleeve having an inwardly extending portion to present areas on the side away from the seal and on the side nearest the seal, all of said areas being exposed to the fluid to be sealed, whereby the pressure of the fluid will tend to force the ring and the sleeve dependent upon the relative areas exposed to the fluid pressure on the different sides of said ring and inwardly extending portion, the areas on the ring being so arranged as to be larger on one side of the ring tending to force the ring in one direction and the relative areas of the inwardly projecting portion being so arranged as to be larger on the side tending to force the sleeve in a like direction.

7. A seal between two relatively rotatable parts comprising a non-rotatable ring member presenting two sealing surfaces, a rotatable shaft having a flange for engagement with one sealing surface of the ring member, a sleeve on the shaft having a sealing surface in engagement with the other surface of the ring, said ring presenting areas on its opposite sides and said sleeve having an inwardly extending portion to present areas on the side away from the seal and on the side nearest the seal, all of said areas being exposed to the fluid to be sealed, whereby the pressure of the fluid will tend to force the ring and the sleeve dependent upon the relative areas exposed to the fluid pressure on the different sides of said ring and inwardly extending portion, the areas on the ring being so arranged as to be larger on one side of the ring tending to force the ring in one direction and the relative areas of the inwardly projecting portion being so arranged as to be larger on the side tending to force the sleeve in a like direction, with the larger area of the inwardly projecting portion larger than the corresponding area of the ring whereby progressively increasing pressures are applied.

8. In a fluid seal for the transmission of liquid from a relatively fixed member to a rotating member having a central bore, containing a plurality of compartments, comprising a ring on the relatively fixed member for providing a portion of an annular chamber for liquid about the axis of the rotating member, a conduit leading from one of said compartments in the bore of the rotating member through said ring, and a return conduit carried by the fixed member and leading to the other compartment through said ring, said conduits being angularly spaced, said ring presenting ground surfaces on either side of said chamber, and cooperating ground surfaces secured to said rotating member for engaging the ground surfaces on said ring, one of said surfaces being carried by a sleeve on said shaft, said sleeve having an inwardly extending portion exposed to said fluid to be sealed to present an area on the side away from the seal and an area on the side nearest the seal whereby the pressure of the fluid will tend to force the inwardly extending portion and member carrying it in directions dependent upon the relative areas exposed to fluid pressure on the different sides of said inwardly extending portion.

9. In a fluid seal for the transmission of liquid from a relatively fixed member to a rotating member having a central bore, comprising a non-rotating ring slidable in the fixed member for providing a portion of an annular chamber for liquid about the axis of the rotating member, a conduit connecting the bore of the rotating member and said chamber, conduit through said ring to said annular chamber and a registering conduit having a sleeve forced against said ring and with relation to which said ring is slidable.

10. In a fluid seal for the transmission of liquid from a relatively fixed member to a rotating member having a central bore comprising a non-rotating ring slidable in the fixed member for providing a portion of an annular chamber for liquid about the axis of the rotating member, a conduit connecting the bore of the rotating member and said chamber, conduit through said ring to said annular chamber and a registering conduit having a sleeve forced against said ring and with relation to which said ring is slidable, said sleeve having areas subject to the pressure of the fluid which it conducts.

11. A seal between two relatively rotatable parts comprising a non-rotatable ring member presenting two sealing surfaces, a rotatable shaft provided with a flange for engagement with one sealing surface of the ring member, a sleeve slidable on and rotatable with the shaft having a sealing surface in engagement with the other sealing surface of the ring, said sleeve having an inwardly extending portion with opposite surfaces exposed to the fluid to be sealed, which said surfaces are so proportioned as to areas and so related as to position as to provide fluid pressure on the sleeve toward the sealing surfaces to govern the effect of the fluid pressure on both of said sealing surfaces by reason of the transmission of the pressure on the sleeve to one sealing surface and thence through the ring to the other sealing surface.

12. A seal between two relatively rotatable parts comprising a non-rotatable ring member presenting two sealing surfaces, a rotatable shaft provided with a flange for engagement with one sealing surface of the ring member, a sleeve slidable on and rotatable with the shaft having a sealing surface in engagement with the other sealing surface of the ring, said sleeve having an inwardly extending portion spaced from the end of the sleeve and with opposite surfaces exposed to the fluid to be sealed, which said surfaces are so proportioned as to areas and so related as to position as to provide fluid pressure on the sleeve toward the sealing surfaces to govern the effect of the fluid pressure on both of said sealing surfaces by reason of the transmission of the pressure on the sleeve to one sealing surface and thence through the ring to the other sealing surface.

13. In a fluid seal for the transmission of liquid from a relatively fixed to a rotating member provided with a bore comprising a ring on the relatively fixed member for providing a portion of an annular chamber for liquid about the axis of the rotating member, a conduit leading from said bore to said chamber and a supply conduit carried by the fixed member also connected to the chamber, said ring presenting ground surfaces on either side of said chamber, and cooperating ground surfaces secured to said rotating member for engaging the ground surfaces on said ring, and means to urge said surfaces into engagement to prevent loss of fluid therethrough.

14. A seal between two relatively rotatable parts comprising a fixed part, a rotatable part, one of said parts provided with a sealing surface, a sleeve on the other part having a sealing surface at one end in engagement with said sealing surface to provide a seal between them, said sealing surfaces being spaced radially outwardly from the contacting surfaces between said relatively rotating parts, said sleeve having at a location intermediate and spaced from its ends a portion extending inwardly and exposed to said fluid to be sealed to present an area on the side away from the seal and an area on the side nearest the seal whereby the pressure of the fluid will tend to force the inwardly extending portion and the sleeve carrying it in directions dependent upon the relative areas exposed to fluid pressure on the different sides of said inwardly extending portion.

15. A seal between relatively rotatable parts comprising a fixed part, a rotatable part, one of said parts being provided with a sealing surface, a resiliently urged sleeve slidable relative to the other part and having a sealing surface at one end in engagement with said other sealing surface to provide a seal between them, said sleeve having at a location intermediate and spaced from its ends a portion extending radially and exposed to the fluid to be sealed to present an area on the side away from the seal and an area on the side near the seal whereby the pressure of the fluid will press upon the radially extending portion and the sleeve carrying it in directions dependent upon the respective areas exposed to fluid pressure on the different sides of the radially extending portion.

ROBERT STEVENSON.